United States Patent Office 2,817,641
Patented Dec. 24, 1957

2,817,641

PROCESS FOR VULCANIZATION OF RUBBER

John J. D'Amico, Charleston, W. Va., assignor to Monsanto Chemical Company, St. Louis, Mo., a corporation of Delaware No Drawing. Application September 18, 1953
Serial No. 381,145

9 Claims. (Cl. 260—41.5)

The present invention relates to a new class of vulcanization accelerators for sulfur-vulcanizable rubbers, namely 5-acyl-4-hydrocarbon-2-mercaptothiazole compounds.

The free mercaptans of this new class of vulcanization accelerators may be represented by the general formula

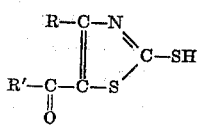

where R and R' are hydrocarbon groups. The mercapto hydrogen is active and a variety of derivatives exhibiting vulcanization accelerating activity are obtained by replacing the hydrogen by other groups, as for example salt forming groups and organic radicals. Examples of salts are the zinc, lead, calcium, magnesium, cadmium, potassium, ammonium salts, the substituted ammonium salts such as cyclohexylammonium, dibutylammonium, isopropylammonium, dimethylammonium, diethylammonium, diisopropylammonium, dodecylammonium salts and the like. Among the organic groups which may replace hydrogen and provide for vulcanization accelerators within the scope of this invention are —$CH_2OH$, aroyl groups as for example benzoyl,

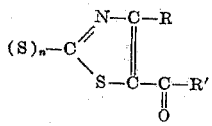

groups wherein $n$ is an integer,

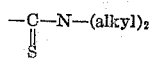

groups, nitrophenyl groups such as 2,4-dinitrophenyl, and —$CH_2$—NH— groups such as

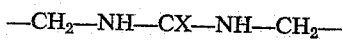

where X is sulfur or oxygen. Compounds containing the latter group may be obtained by condensing a free mercaptan with formaldehyde and a primary amine such as aniline or by condensing the free mercaptan with dimethylolurea or dimethylol thiourea.

An important class of vulcanization accelerators of this invention for sulfur-vulcanizable rubbers are the sulfenamides, i. e. compounds wherein the hydrogen of the mercapto group is replaced by an —N< group and particularly an —NH— group. Suitable examples of such are an amino group, methylamino, ethylamino, isopropylamino, n-butylamino, sec-butylamino, n-amylamino, cyclohexylamino, alpha-methyl cyclohexylamino, alpha-ethyl cyclohexylamino, gamma-methyl cyclohexylamino, benzylamino, alpha-methyl benzylamino, furfurylamino, tetrahydrofurfurylamino, beta-phenethylamino, 2-hydroxy ethylamino, dimethylamino, diethylamino, diisopropylamino, diallylamino, di-n-butylamino, diamylamino, di-beta-phenethylamino, di-2-thenylamino, N-methyl cyclohexylamino, dicyclohexylamino, di-2-cyanoethylamino, morpholinyl, piperidyl, alpha-methylpiperidyl, and gamma-methylpiperidyl.

Another group of vulcanization accelerators within the scope of this invention are bis-thiazolyl compounds derived from diamines, as for example 2,5-dimethyl piperazine, piperazine, the alkylene diamines such as ethylene diamine and the like. Examples of such are represented structurally as follows:

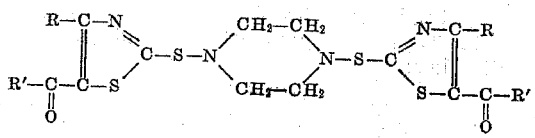

and

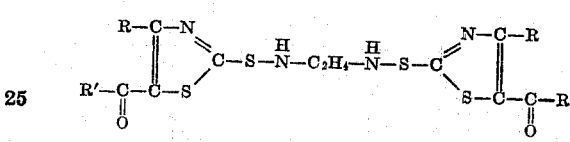

where R and R' are hydrocarbon groups.

In the foregoing formulae R and R' are preferably simple alkyl groups such as methyl, ethyl, propyl, butyl, isopropyl, isobutyl and amyl. However, it is to be understood that alicyclic groups such as cyclohexyl, etc., aralkyl groups such as benzyl, phenethyl, etc., and aryl groups such as phenyl, tolyl, naphthyl, xenyl and the like are contemplated.

The free mercaptan vulcanization accelerators of this invention may be prepared by condensing a 3-chloro-2,4-dione of the formula R'—CO.—CHCl—CO.—R with ammonium dithiocarbamate. For example, 236 grams of the 3-chloro-2,4-pentanedione was added to a solution of 194 grams (1.76 moles) of ammonium dithiocarbamate in 1300 grams of water. The reaction mixture was stirred vigorously, the exothermic reaction causing the temperature to rise to about 52° C. and within a short time a solid precipitated. The mixture was stirred for about 8 hours and then the solids filtered off, washed with water until the washings were neutral to litmus and finally dried in an oven at 50° C. There was obtained 226 grams or 74.4% of 2-mercapto-4-methyl-5-thiazolyl methyl ketone, a yellow solid, M. P. 210–211° C. when recrystallized from ethyl alcohol. Analysis for nitrogen gave 8.00% and for sulfur 37.30% as compared to calculated values for $C_6H_7NOS_2$ of 8.09% nitrogen and 37.01% sulfur.

As exemplary of the preparation of salt vulcanization accelerators of this invention, a solution of 27.4 grams (0.20 mole) of zinc chloride in 1160 grams of water was added with agitation to a solution of 69.3 grams (0.40 mole) of 2-mercapto-4-methyl-5-thiazolyl methyl ketone in 160 grams (0.40 mole) of 10% aqueous sodium hydroxide. The reaction mixture was stirred for one hour, the resulting precipitate filtered, washed with water until the washings were neutral to litmus and finally dried in an oven at 50° C. The zinc salt was a cream powder, M. P. 147–155° C. Analysis gave 6.16% nitrogen and 31.27% sulfur as compared to calculated values for

of 6.84% nitrogen and 31.29% sulfur.

In a similar manner but employing cadmium sulfate instead of zinc chloride in the foregoing procedure, the cadmium salt (melting at 193–200° C. with decomposition) was obtained.

As illustrative of the accelerating properties of the free mercaptans and metal salts thereof, rubber stocks were compounded comprising

| Stock | A | B | C |
|---|---|---|---|
| | Parts by weight | | |
| Smoked sheets rubber | 100 | 100 | 100 |
| Zinc oxide | 5 | 5 | 5 |
| Stearic acid | 1 | 1 | 1 |
| Sulfur | 3 | 3 | 3 |
| 2-Mercaptobenzothiazole | 1 | | |
| 2-Mercapto-4-methyl-5-thiazolyl methyl ketone | | 1 | |
| Zinc salt of 2-mercapto-4-methyl-5-thiazolyl methyl ketone | | | 1 |

The stocks so compounded were vulcanized in the usual manner by heating in a press for different periods of time at 135° C. The physical properties of the vulcanizates are set forth below:

TABLE I

| Stock | Cure Time in Mins. | Modulus of Elasticity in lbs./in.² at Elongation of 500% | Tensile at Break in lbs./in.² | Ultimate Elongation Percent |
|---|---|---|---|---|
| A | 30 | 523 | 2,886 | 746 |
| B | 30 | 810 | 3,575 | 730 |
| C | 30 | 640 | 2,760 | 780 |
| A | 45 | 445 | 3,110 | 785 |
| B | 45 | 655 | 3,385 | 730 |
| C | 45 | 650 | 3,025 | 765 |

Other metal salts of 5-acyl-4-hydrocarbon-2-mercaptothiazoles than the zinc salt provide for efficient vulcanization accelerators for sulfur-vulcanizable rubbers. For example the cadmium salt of 2-mercapto-4-methyl-5-thiazolyl methyl ketone upon evaluating in a butadiene-styrene copolymer (GR-S 100) tread stock, exihibited physical properties and scorch properties comparable to a control employing as the accelerator the cadmium salt of 2-mercaptobenzothiazole. Additionally, the ammonium and substituted ammonium salts of 2-mercapto-4-methyl-5-thiazolyl methyl ketone exhibited vulcanization accelerating activity as for example in Hevea rubber latex formulations.

Another class of vulcanization accelerators within the scope of this invention are the sulfides. The disulfides may be prepared directly from the corresponding free mercaptan by oxidation. Despite the presence of the carbonyl group, oxidation of the 5-acyl-4-hydrocarbon-2-mercaptothiazoles with ammonium persulfate, chlorine, hydrogen peroxide, sodium hypochlorite and other oxidizing agents converts the mercaptan smoothly to the corresponding disulfide. The reaction may be conveniently carried out in aqueous medium employing either a suspension of the free mercaptan or a solution of an alkali metal salt thereof. Monosulfides may be prepared from the disulfides by reacting the latter with sodium cyanide. The disulfides take up additional sulfur on heating therewith to form higher sulfides. Additionally, higher sulfides may be produced by reacting the 5-acyl mercaptothiazoles with sulfur halides.

The following example illustrates in detail the preparation of a disulfide vulcanization accelerator of this invention.

A fine suspension of 69.3 grams (0.40 mole) of 2-mercapto-4-methyl-5-thiazolyl methyl ketone in 400 ml. of water was prepared in a one liter, three-necked flask, equipped with a mechanical stirrer, dropping funnel, and a thermometer. To this agitated slurry there was added dropwise 339 grams (0.44 mole) of a 30% aqueous solution of ammonium persulfate in 30 minutes at 25–30° C. The mixture was stirred for two hours longer, the precipitate filtered off, and dried at 50° C. The product, a tan solid, was obtained in 99.0% yield. Analysis gave 8.09% nitrogen and 37.22% sulfur as compared to the calculated values for 2,2'-dithiobis-(5-acetyl-4-methylthiazole), $C_{12}H_{12}N_2O_2S_4$, of 8.13% nitrogen and 37.23% sulfur. The molecular weight obtained by the freezing point method using benzene as the solvent was 342.0; calculated 344.5.

In order to illustrate the accelerating activity of the sulfide vulcanization accelerators of this invention as compared to a commercial thiazole sulfide accelerator, vulcanizable compositions were compounded comprising

| Stock | D | E | F | G |
|---|---|---|---|---|
| | Parts by weight | | | |
| Smoked sheets rubber | 100 | 100 | 100 | 100 |
| Zinc oxide | 5 | 5 | 5 | 5 |
| Stearic acid | 1 | 1 | 1 | 1 |
| Sulfur | 3 | 3 | 3 | 3 |
| 2,2'-Dithiobis benzothiazole | 1 | | 0.7 | |
| 2,2'-Dithiobis-(5-acetyl-4-methylthiazole) | | 1 | | 0.7 |
| Diphenyl guanidine | | | 0.3 | 0.3 |

The unactivated stocks were cured in the usual manner by heating in a press for 45 minutes at 135° C. and those containing the diphenyl guanidine activator were cured by heating for 15 minutes at the same temperature.

TABLE II

| Stock | Modulus of Elasticity in lbs./in.² at Elongation of 500% | Tensile at Break in lbs./in.² | Ultimate Elongation, Percent |
|---|---|---|---|
| D | 540 | 2,903 | 793 |
| E | 765 | 3,260 | 750 |
| F | 1,380 | 4,360 | 700 |
| G | 1,780 | 4,295 | 665 |

As aforenoted, the sulfenamide derivatives of a 5-acyl-4-hydrocarbon-2-mercaptothiazole represent a preferred embodiment of this invention and as illustrative of this class and preparation thereof is the following:

*5-acetyl-N,N-diethyl-4-methyl-2-thiazolesulfenamide*

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 73 grams (1.0 mole) of diethylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 170 ml. (15.0 g./100 ml.) of sodium hypochlorite solution. The excess sodium hypochlorite was destroyed by the addition of one gram of sodium sulfite. The reaction mixture was cooled to 10° C., extracted with 500 ml. of ethyl ether, the ether extract washed with water until the washings were neutral to litmus, dried over sodium sulfate, and finally the ether removed in vacuo. A yield of 25 grams of a dark oily product was obtained. Analysis gave 11.52% nitrogen and 26.31% sulfur as compared to 11.46% nitrogen and 26.24% sulfur calculated for $C_{10}H_{16}N_2OS_2$.

*5-acetyl-N-cyclohexyl-4-methyl-2-thiazolesulfenamide*

An aqeous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 99 grams (1.0 mole) of cyclohexylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 170 ml. (15.0 g./100 ml.) of sodium hypochlorite solution. The excess sodium hypochlorite was destroyed by the addition of one gram of sodium sulfite. The yellow solid precipitate was removed by filtration, washed with water and dried at room temperature. 47 grams representing a yield of 69.8% was obtained, M. P. 114–115° C. Analysis gave 10.39% nitrogen and 23.27% sulfur as compared to 10.36% nitrogen and 23.72% sulfur calculated for $C_{12}H_{18}N_2OS_2$.

5-acetyl-N-isopropyl-4-methyl-2-thiazolesulfenamide

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 59.1 grams (1.0 mole) of monoisopropylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of three hours, 190 ml. (15.0 g./100 ml.) of sodium hypochlorite solution. The excess sodium hypochlorite was destroyed by the addition of one gram of sodium sulfite. The reaction mixture was cooled to 10° C., extracted with 500 ml. of ethyl ether, the ether extract washed with water until the washings were neutral to litmus, dried over sodium sulfate, and finally the ether removed in vacuo. The residue remaining after the removal of the ether was a semi-solid. The latter was diluted with water, the solid removed by filtration and dried at room temperature. 40 grams representing a 69.5% yield of a tan solid was obtained, M. P. 50–52° C. Analysis gave 11.97% nitrogen and 27.72% sulfur as compared to 12$\frac{6}{16}$% nitrogen and 27.84% sulfur calculated for $C_9H_{14}N_2OS_2$.

4-(5-actyl-4-methyl-2-thiazolylsulfenyl)morpholine

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 65.5 grams (0.75 mole) of morpholine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 160 ml. (15.0 g./100 ml.) of sodium hypochlorite solution. The excess sodium hypochlorite was destroyed by the addition of one gram of sodium sulfite. The solids were removed by filtration, washed with water and dried at room temperature. The product was a buff solid, M. P. 115–115° C. The yield was 56 grams or 86.7% of theoretical. Analysis gave 11.08% nitrogen and 24.47% sulfur as compared to 10.84% nitrogen and 24.82% sulfur calculated for $C_{10}H_{14}N_2O_2S_2$.

5-acetyl-N-tert-butyl-4-methyl-2-thiazolesulfenamide

To a cooled aqueous solution containing 43.3 grams (0.25 mole) of 2-mercapto-4-methyl-5-thiazolyl methyl ketone, 170 grams of water, and 40 grams (0.25 mole) of 25% aqueous sodium hydroxide solution, 73.2 grams (1.0 mole) of tert-butylamine was added with agitation at such a rate that the reaction mixture did not exceed a temperature of 27° C. The mixture was cooled to 13° C. and 42 ml. of 25% sulfuric acid added dropwise at 13–15° C. in 20 minutes. To this mixture at 13–20° C., was added, drop by drop, with stirring over a period of two hours, 200 ml. (15.0 g./100 ml.) of aqueous sodium hypochlorite solution. The excess sodium hypochlorite was destroyed by the addition of 1 gram of sodium sulfate. The reaction mixture was stirred for 30 minutes longer, cooled to 10° C., the precipitate filtered, washed with water until free of chloride, and dried at room temperature. A yield of 29 grams (47.6%) of a tan solid, M. P. 108–110° C., was obtained. After recrystallization from heptane, it melted at 115–116° C. Analysis gave 11.26% nitrogen and 26.57% sulfur as compared to 11.46% nitrogen and 26.24% sulfur calculated for $C_{10}H_{16}N_2OS_2$.

As exemplary of the accelerating activity of sulfenamides rubber stocks were compounded comprising:

| Stock | H | J | K |
|---|---|---|---|
| | Parts by weight | | |
| Pale crepe rubber | 100 | 100 | 100 |
| Furnace carbon black | 50 | 50 | 50 |
| Zinc oxide | 5 | 5 | 5 |
| Saturated hydrocarbon softener | 3 | 3 | 3 |
| Stearic acid | 2 | 2 | 2 |
| Sulfur | 2.5 | 2.5 | 2.5 |
| Condensation product of p-amino biphenyl and acetone | 1.5 | 1.5 | 1.5 |
| 5-Acetyl-N, N-diethyl-4-methyl-2-thiazole-sulfenamide | 0.8 | | |
| 5-Acetyl-N-cyclohexyl-4-methyl-2-thiazole-sulfenamide | | 0.8 | |
| 4-(5-Acetyl-4-methyl-2-thiazolylsulfenyl)-morpholine | | | 0.8 |

The stocks so compounded were cured in the usual manner by heating in a press for 30 minutes at 144° C. The physical properties of the vulcanizates are set forth below:

TABLE III

| Stock | Modulus of Elasticity in lbs./in.² at Elongation of 300% | Tensile at Break in lbs./in.² | Ultimate Elongation, Percent |
|---|---|---|---|
| H | 2,980 | 4,205 | 413 |
| J | 3,210 | 4,170 | 415 |
| K | 3,113 | 4,133 | 406 |

Evaluation of the processing safety of the stocks by means of a Mooney Plastometer revealed that 5-acetyl-N-cyclohexyl-4-methyl-2-thiazolesulfenamide and 4-(5-acetyl-4-methyl-2-thiazolyl-sulfenyl)morpholine were delayed action type accelerators equivalent in processing safety to the commercial accelerator N-cyclohexyl-2-benzothiazolesulfenamide. On the other hand 5-acetyl-N,N-diethyl-4-methyl-2-thiazolesulfenamide was an accelerator of a different type possessing no significant delayed action. The Mooney scorch data were obtained at 121° C. following A. S. T. M. D 1077–49T except that the scorch point was taken at 10 units higher than the minimum instead of 5 units as described in the procedure. Experience has established that this modification gives reproducible results.

TABLE IV

| Stock | Mooney Scorch Point, Time in minutes |
|---|---|
| H | 3 |
| J | 16 |
| K | 19 |

The accelerating properties of 5-acetyl-N-tert-butyl-4-methyl-2-thiazolesulfenamide as compared to a commercial thiazole type vulcanization accelerator were determined in rubber stocks comprising:

| Stock | L | M |
|---|---|---|
| | Parts by weight | |
| Smoked sheets | 100 | 100 |
| Furnace carbon black | 50 | 50 |
| Zinc oxide | 5 | 5 |
| Saturated hydrocarbon softener | 3 | 3 |
| Stearic acid | 2 | 2 |
| Sulfur | 2.5 | 2.5 |
| Mercaptobenzothiazole | 0.8 | |
| 5-Acetyl-N-tert-butyl-4-methyl-2-thiazole-sulfenamide | | 0.8 |

The stocks so compounded were cured for different periods of time by heating in a press at 144° C. The physical properties of the vulcanizates are set forth below:

TABLE V

| Stock | Cure Time in Mins. | Modulus of Elasticity in lbs./in.² at Elongation of 300% | Tensile at Break in lbs./in.² | Ultimate Elongation Percent |
|---|---|---|---|---|
| L | 30 | 1,963 | 3,410 | 460 |
| M | 30 | 3,250 | 3,900 | 400 |
| L | 60 | 1,950 | 3,456 | 473 |
| M | 60 | 3,340 | 3,885 | 375 |

The scorch times determined on a Mooney Plastometer at 121° C. as described are as follows:

TABLE VI

| Stock | Scorch Time, Minutes |
|---|---|
| L | 4 |
| M | 9 |

Another class of vulcanization accelerators falling within the scope of the present invention are the dialkyl dithiocarbamates, i. e. those compounds having the group (alkyl)$_2$N—CS.S— attached to the thiazole nucleus in the 2-position. Of this class the di-lower alkyl (i. e. dimethyl, diethyl, dipropyl and dibutyl) dithiocarbamates are a particularly useful class of vulcanization accelerators for sulfur-vulcanizable rubbers. As illustrative of their preparation is the following:

*5-acetyl-4-methyl-2-thiazolyl diethyl dithiocarbamate*

Into a suitable container was charged 52 grams (0.3 mole) of 2-mercapto-4-methyl-5-thiazolyl methyl ketone, 600 ml. of acetone, 20 ml. of water and 12 grams of sodium hydroxide. The mixture was stirred to effect solution and to this solution there was gradually added at a temperature of 32° C. over a period of 25 minutes a solution of 45.4 grams (0.3 mole) of diethyl dithiocarbamyl chloride dissolved in 200 ml. of acetone. The reaction mixture was then stirred for four hours, the sodium chloride removed by filtration, the acetone removed in vacuo and the solids separated from the residue by filtration. The solids were washed with water and air dried at 25° C. The product so obtained was a brown solid, M. P. 71–72° C. when crystallized from ethyl alcohol and water. The yield was 77 grams or 89%. Analysis gave 9.90% nitrogen and 33.40% sulfur as compared to 9.71% nitrogen and 33.35% sulfur calculated for $C_{11}H_{16}N_2OS_3$.

As illustrative of the accelerating properties of the dithiocarbamate vulcanization accelerators of this invention, a butadiene-styrene synthetic rubber vulcanizable composition was compounded comprising:

| Stock | N (Parts by weight) |
|---|---|
| Butadiene-styrene copolymer (GR-S 100) | 100 |
| Furnace carbon black | 50 |
| Saturated hydrocarbon softener | 10 |
| Zinc oxide | 4.0 |
| Stearic acid | 2.0 |
| Sulfur | 1.75 |
| Condensation product of acetone and p-amino biphenyl | 1.50 |
| 5-Acetyl-4-methyl-2-thiazolyl diethyl dithiocarbamate | 1.2 |

The stocks were cured for different periods of time by heating in a press at 144° C. The physical properties of the vulcanizates are set forth below:

TABLE VII

| Cure Time in Mins. | Modulus of Elasticity in lbs./in.² at Elongation of— | | Tensile at Break in lbs./in.² | Ultimate Elongation, Percent |
|---|---|---|---|---|
| | 300% | 500% | | |
| 30 | 640 | 1,515 | 2,150 | 680 |
| 60 | 1,176 | 2,356 | 2,470 | 536 |

The scorch time determined on a Mooney Plastometer employing the large rotor at 135° C. was 37 minutes.

Another class of vulcanization accelerators falling within the scope of this invention are the triazine derivatives of a 5-acyl-4-hydrocarbon-2-mercaptothiazole. In general these compounds are fast acting accelerators in the vulcanization of Hevea rubber stocks. As illustrative of this class of compounds and the preparation thereof is the following:

*2,4,6-tris(5-acetyl-4-methyl-2-thiazolyl)-s-triazine*

A solution was prepared containing 69.3 grams (0.4 mole) of 2-mercapto-4-methyl-5-thiazolyl methyl ketone and 22.4 grams of potassium hydroxide in 580 ml. of acetone. To this solution a solution of 24.5 grams (0.133 mole) of cyanuric chloride in 500 ml. of acetone was added dropwise at 50° C. The reaction mixture was then heated at 55–56° C. for four hours and allowed to cool to 25° C. and the solid product filtered off, washed with water until free of chloride and dried at 50° C. The tan product obtained in a yield of 57 grams or 72.4% melted at 185–187° C. Analysis gave 14.78% nitrogen and 32.10% sulfur as compared to 14.13% nitrogen and 32.34% sulfur calculated for $C_{21}H_{18}N_6O_3S_6$.

By the term "sulfur-vulcanizable rubber" as employed in the specification and claims is meant natural as well as synthetic rubbers which are capable of vulcanization when heated with sulfur and includes latices and reclaims of such materials whether or not admixed with pigments, fillers, softeners, antioxidants, etc.

This application is a continuation-in-part of application Serial No. 294,930, filed June 21, 1952.

What is claimed is:

1. The method of vulcanizing a rubber said rubber being hydrocarbon rubber the major proportion of which is a diene hydrocarbon which comprises heating a sulfur-vulcanizable rubber and sulfur in the presence of a 2-mercapto-4-hydrocarbon-5-acyl-thiazole compound.

2. The method of vulcanizing a rubber said rubber being hydrocarbon rubber the major proportion of which is a diene hydrocarbon which comprises heating a sulfur-vulcanizable rubber, sulfur, a furnace carbon black and as a vulcanization accelerator for said rubber a 2-mercapto-4-methyl-5-acetyl-thiazole compound of the structural formula

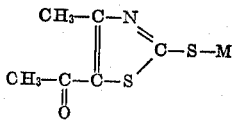

where M is selected from the group consisting of hydrogen, metal salt forming groups, ammonium and organic radicals.

3. The method of vulcanizing a rubber said rubber being hydrocarbon rubber the major proportion of which is a diene hydrocarbon which comprises heating a sulfur-vulcanizable rubber and sulfur in the presence of a sulfenamide of a 2-mercapto-4-alkyl-5-acyl-thiazole.

4. The method of vulcanizing a rubber said rubber being hydrocarbon rubber the major proportion of which is a diene hydrocarbon which comprises heating a sulfur-vulcanizable rubber and sulfur in the presence of a sulfenamide of a 2-mercapto-4-methyl-5-acetyl-thiazole having the nucleus

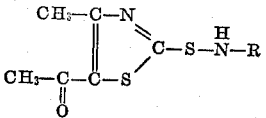

where R is a hydrocarbon radical containing less than 9 carbon atoms.

5. The method of vulcanizing a rubber said rubber being hydrocarbon rubber the major proportion of which is a diene hydrocarbon which comprises heating a sulfur-vulcanizable rubber and sulfur in the presence of 2-mercapto-4-methyl-5-thiazolyl methyl ketone.

6. The method of vulcanizing a rubber said rubber being hydrocarbon rubber the major proportion of which is a diene hydrocarbon which comprises heating a sulfur-vulcanizable rubber and sulfur in the presence of 4-(5-acetyl-4-methyl-2-thiazolylsulfenyl)morpholine.

7. The method of vulcanizing a rubber said rubber being hydrocarbon rubber the major proportion of which is a diene hydrocarbon which comprises heating a sulfur-vulcanizable rubber and sulfur in the presence of 5-acetyl-N-cyclohexyl-4-methyl-2-thiazolesulfenamide.

8. The method of vulcanizing a rubber said rubber being hydrocarbon rubber the major proportion of which is a diene hydrocarbon which comprises heating a sulfur-vulcanizable rubber and sulfur in the presence of 5-acetyl-N-tert-butyl-4-methyl-2-thiazolesulfenamide.

9. The method of vulcanizing a rubber said rubber being hydrocarbon rubber the major proportion of which is a diene hydrocarbon which comprises heating a sulfur-vulcanizable rubber and sulfur in the presence of 2,2'-dithio-bis-(5-acetyl-4-methyl-thiazole).

References Cited in the file of this patent
UNITED STATES PATENTS

| | | |
|---|---|---|
| 2,426,855 | Beber | Sept. 2, 1947 |
| 2,445,722 | Carr et al. | July 20, 1948 |
| 2,581,905 | Carr et al. | Jan. 8, 1952 |
| 2,666,043 | Carr et al | Jan. 12, 1954 |